United States Patent
Drevon et al.

(10) Patent No.: US 11,729,164 B2
(45) Date of Patent: Aug. 15, 2023

(54) SUPPORT OF IMEI CHECKING FOR WLAN ACCESS TO A PACKET CORE OF A MOBILE NETWORK

(71) Applicant: Alcatel Lucent, Nozay (FR)

(72) Inventors: Nicolas Drevon, Nozay (FR); Laurent Thiebaut, Nozay (FR); Bruno Landais, Lannion (FR)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 15/773,111

(22) PCT Filed: Nov. 10, 2016

(86) PCT No.: PCT/EP2016/077276
§ 371 (c)(1),
(2) Date: May 2, 2018

(87) PCT Pub. No.: WO2017/081158
PCT Pub. Date: May 18, 2017

(65) Prior Publication Data
US 2018/0317087 A1    Nov. 1, 2018

(30) Foreign Application Priority Data

Nov. 11, 2015 (EP) .................................. 15306791.3
Mar. 22, 2016 (EP) .................................. 16305322.6

(51) Int. Cl.
*H04W 12/06* (2021.01)
*H04L 9/40* (2022.01)
(Continued)

(52) U.S. Cl.
CPC ...... *H04L 63/0876* (2013.01); *H04L 63/0892* (2013.01); *H04W 8/08* (2013.01);
(Continued)

(58) Field of Classification Search
CPC ..... H04W 12/06; H04W 8/08; H04W 84/082; H04W 84/12; H04L 63/0892; H04L 63/0876
(Continued)

(56) References Cited

U.S. PATENT DOCUMENTS

| 10,382,958 B2 * | 8/2019 | Chen ................... H04L 63/0823 |
| 2014/0165149 A1 | 6/2014 | Chen et al. |
| 2018/0160360 A1* | 6/2018 | Zhou ................... H04L 63/0892 |

FOREIGN PATENT DOCUMENTS

| WO | WO-2010/013914 A2 | 2/2010 |
| WO | WO-2014/117811 A1 | 8/2014 |

OTHER PUBLICATIONS

International Search Report PCT/ISA/210 for International Application No. PCT/EP2016/077276 dated Jan. 30, 2017.
(Continued)

*Primary Examiner* — Jeffrey C Pwu
*Assistant Examiner* — Nega Woldemariam
(74) *Attorney, Agent, or Firm* — Harness, Dickey & Pierce, P.L.C.

(57) ABSTRACT

Embodiments of the invention include an entity, such as ePDG or TWAN entity, capable of serving a User Equipment for WLAN access to a Packet Core such as EPC of a mobile network, said entity configured to:
provide at least one of:
an indication whether IMEI checking is requested,
an indication whether IMEI checking by a visited EIR or by a home EIR is requested,
an indication of an action to be taken upon IMEI check result.

20 Claims, 9 Drawing Sheets

Figure 1:
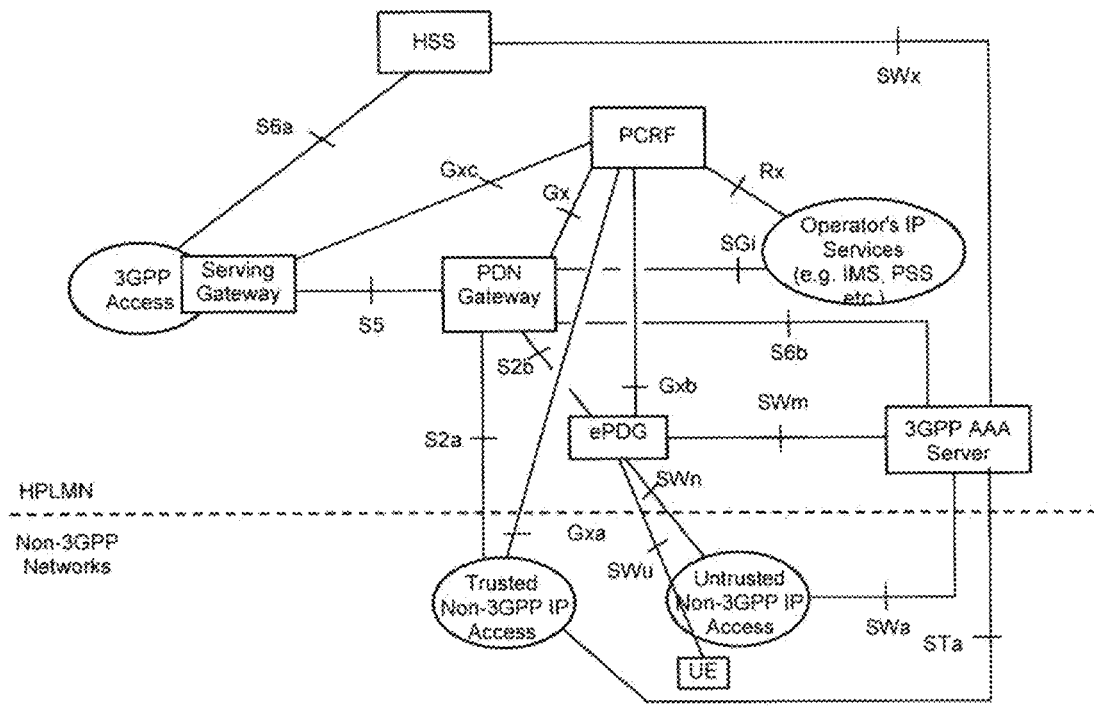

(51) Int. Cl.
  *H04W 12/062* (2021.01)
  *H04W 8/08* (2009.01)
  *H04W 84/12* (2009.01)
(52) U.S. Cl.
  CPC .......... *H04W 12/062* (2021.01); *H04W 8/082* (2013.01); *H04W 84/12* (2013.01)
(58) Field of Classification Search
  USPC .......................................................... 726/4
  See application file for complete search history.

(56) References Cited

OTHER PUBLICATIONS

Written Opinion of the International Searching Authority PCT/ISA/237 for International Application No. PCT/EP2016/077276 dated Jan. 30, 2017.

"SA WG2 Meeting #114" Handling of IMEI checking. Apr. 11-15, 2016, Sophia Antioplois France.

"3rd Generation Partnership Project; Technical Specification Group Services and System Aspects; Architecture enhancements for non-3GPP accesses (Release 13)", Sep. 17, 2015 (Sep. 17, 2015), XP051071779, Retrieved from the Internet <URL:http://www.3gpp.org/ftp/tsg_sa/WG2_Arch/Latest_SA2_Specs/DRAFT_INTERIM/Archive/> [retrieved on Sep. 17, 2015].

Office Action dated Nov. 11, 2019, issued in corresponding European Application No. 16 305 322.6.

Chinese Office Action dated Jun. 2, 2020, issued in corresponding Chinese Patent Application No. 201680065905.4.

Indian Examination Report dated Jul. 15, 2020 issued in corresponding Indian Application No. 201847017640.

European Office Action dated Sep. 18, 2020 issued in corresponding European Appln. No. 16305322.6.

European Office Action dated Sep. 27, 2021 issued in corresponding European Appln. No. 16305322.6.

\* cited by examiner

SUPPORT OF IMEI CHECKING FOR WLAN ACCESS TO A PACKET CORE OF A MOBILE NETWORK

CROSS-REFERENCE TO RELATED APPLICATIONS

This application is the U.S. National Phase application of PCT Application No. PCT/EP2016/077276 filed on Nov. 10, 2016, which claims priority to European Patent Application No. 16305322.6 filed on Mar. 22, 2016 and European Patent Application No. 15306791.3 filed on Nov. 11, 2015, the entire contents of each of which are incorporated herein by reference.

The present invention generally relates to mobile communication networks and systems.

Descriptions of mobile networks and systems can be found in the literature, such as in particular in Technical Specifications published by standardization bodies such as for example 3GPP ($3^{rd}$ Generation Partnership Project).

An example of 3GPP mobile system is EPS (Evolved Packet System). An EPS network comprises a Core Network called EPC (Evolved Packet Core) that can be accessed not only by 3GPP access, but also by non-3GPP access, such as in particular WLAN access will be considered more particularly in the following. WLAN access to EPC is specified in particular in 3GPP TS 23.402, and includes Trusted WLAN access and Untrusted WLAN access. An example of non-roaming architecture for 3GPP and Non 3GPP (Trusted or Untrusted) access to EPC is recalled in FIG. 1 taken from 3GPP TS 23.402. An example of roaming architecture for 3GPP and Non 3GPP (Trusted or Untrusted) access to EPC is recalled in FIG. 2 taken from 3GPP TS 23.402.

In a system such as EPS for example, a UE may connect to various external networks (referred to as Packet Data Network PDN, an example being an operator's IMS network), via EPC providing connectivity (referred to as PDN connectivity) services. User authentication and authorization procedures are generally performed before granting access and providing connectivity services at establishment of a PDN connection or EPC session.

Untrusted WLAN access to EPC involves entities such as ePDG (evolved Packet Data Gateway) and 3GPP AAA Server (and 3GPP AAA Proxy in case of raoming), and interfaces such as SWa interface between WLAN AN (WLAN Access Network) and 3GPP AAA Server (or between WLAN AN and 3GPP AAA Proxy in case of roaming), and SWm interface between ePDG and 3GPP AAA Server (or between ePDG and 3GPP AAA Proxy in case of roaming), as specified in particular by 3GPP TS 23.402. Authentication and authorization procedures and protocols for these procedures are specified in particular in 3GPP TS 33.402 and 3GPP TS 29.273.

Trusted WLAN access to EPC involves entities such as TWAN (Trusted WLAN Access Network) and 3GPP AAA Server (and 3GPP AAA Proxy in case of raoming), and interfaces such as STa interface between TWAN and 3GPP AAA Server (or between TWAN and 3GPP AAA Proxy in case of roaming), as specified in particular by 3GPP TS 23.402 and 3GPP TS 29.273. Authentication and authorization procedures and protocols for these procedures are specified in particular in 3GPP TS 33.402 and 3GPP TS 29.273.

In such systems, an IMEI (International Mobile Equipment Identity) has been defined for mobile equipment identification purpose. As specified in particular by 3GPP TS 23.002, an equipment may be classified as white-listed, grey-listed or black-listed or may be unclassified. Such lists are specified in particular in 3GPP TS 22.016. The white list is composed of all number series of equipment identities that are permitted for use. The black list contains all equipment identities that belong to equipment that need to be barred. Besides the black and white list, administrations have the possibility to use a grey list. Equipments on the grey list are not barred (unless on the black list or not on the white list), but are tracked by the network (for evaluation or other purposes).

IMEI checking procedures may be performed, whereby a mobile equipment (or UE) may provide its IMEI upon request, and the network may check the status of this IMEI with the EIR (Equipment Identity register).

As recognized by the inventors, and as will be explained with more details later, there is a need to enhance IMEI checking in such systems, in particular for WLAN access (Trusted or Untrusted) to EPC.

Embodiments of the present invention in particular address such needs.

These and other objects are achieved, in one aspect, by an entity, such as ePDG or TWAN entity, capable of serving a User Equipment for WLAN access to a Packet Core such as EPC of a mobile network, said entity configured to:
provide at least one of:
an indication whether IMEI checking is requested,
an indication whether IMEI checking by a visited EIR or by a home EIR is requested,
an indication of an action to be taken upon IMEI check result.

These and other objects are achieved, in another aspect, by an entity such as a 3GPP AAA Proxy, respectively a 3GPP AAA Server, configured to:
perform at least one step related to IMEI checking, based on at least one indication from an entity, such as ePDG or TWAN entity, capable of serving a User Equipment for WLAN access to a Packet Core such as EPC of a mobile network, among:
an indication whether IMEI checking is requested,
an indication whether IMEI checking by a visited EIR or by a home EIR is requested,
an indication of an action to be taken upon IMEI check result.

These and other objects are achieved, in other aspects, by method(s) for support of IMEI checking for WLAN access to a Packet Core such as EPC of a mobile network, said method comprising at least one step performed by at least one of such entities (entity such as ePDG or TWAN entity capable of serving a User Equipment for WLAN access to a Packet Core such as EPC of a mobile network, and entity such as 3GPP AAA Proxy or 3GPP AAA Server).

Figure 2:
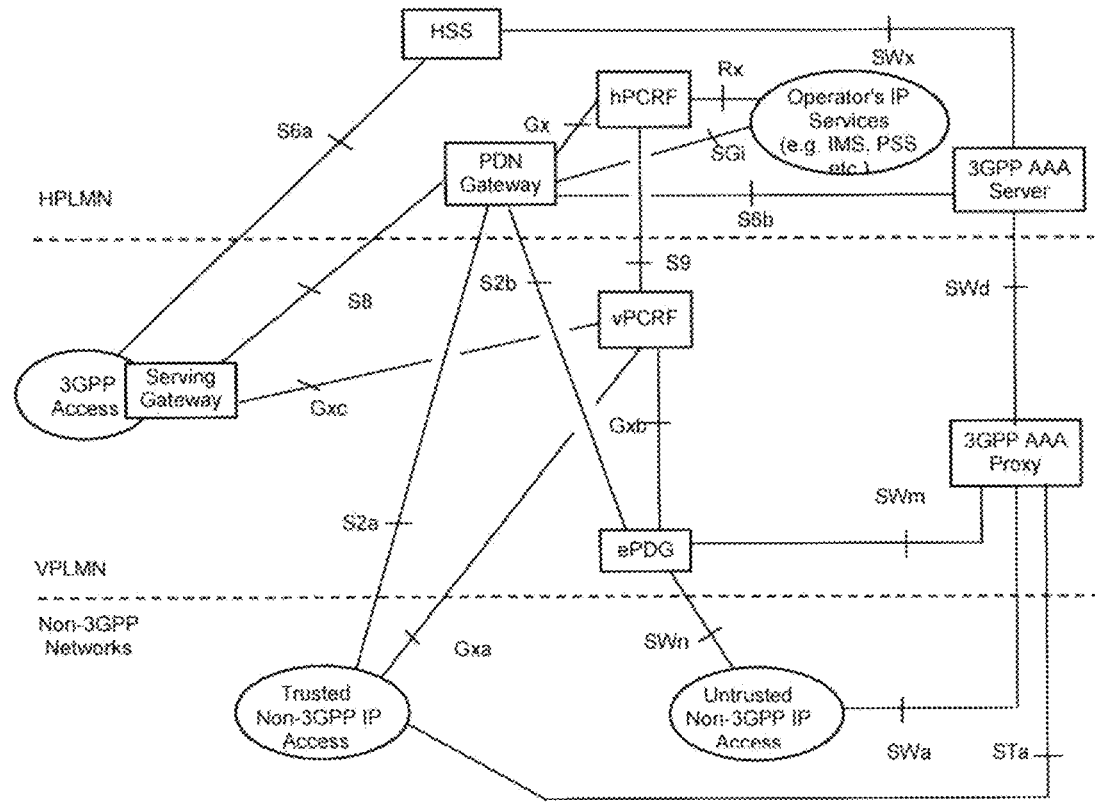
Figure 3:
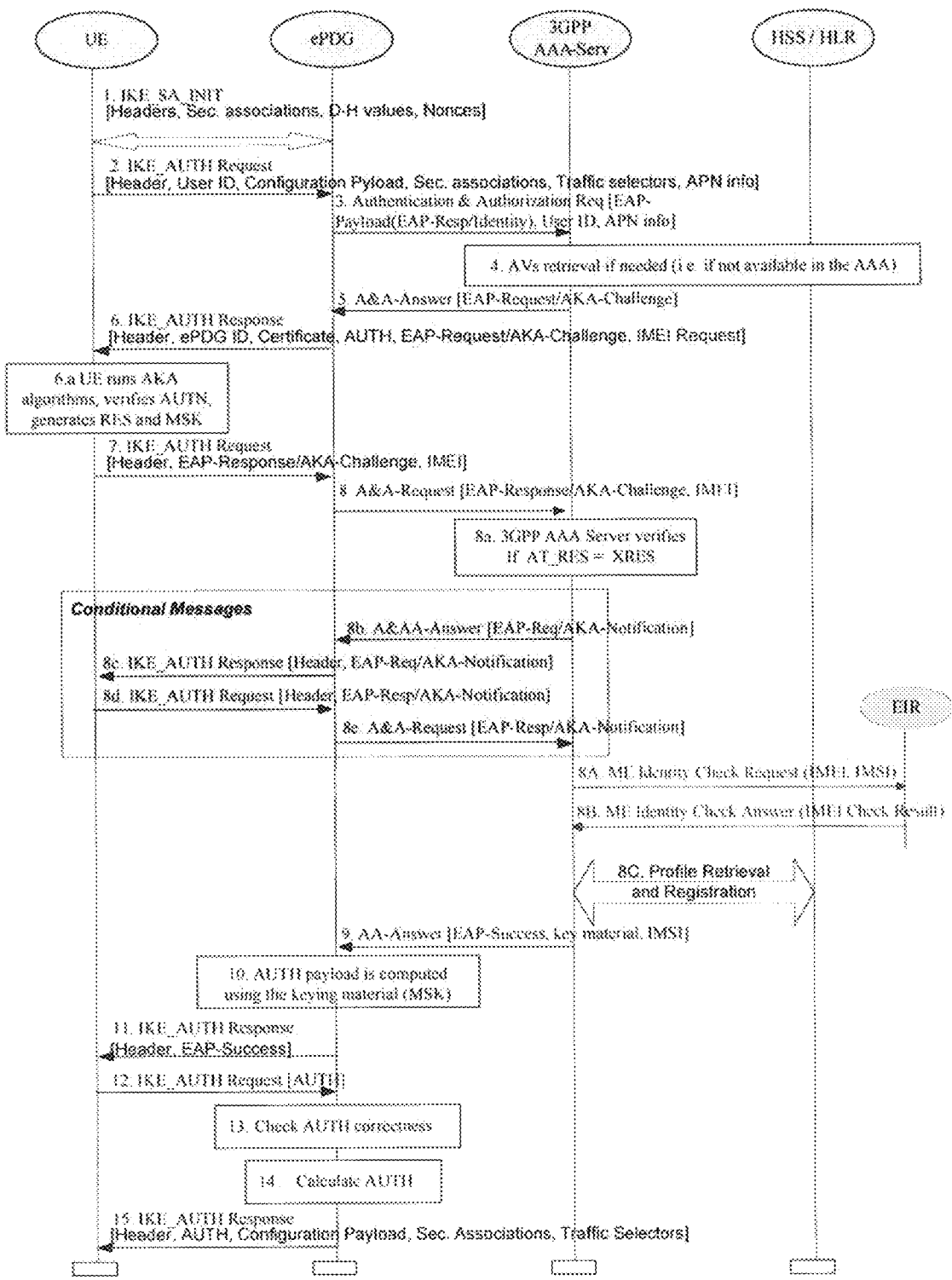
Figure 4:
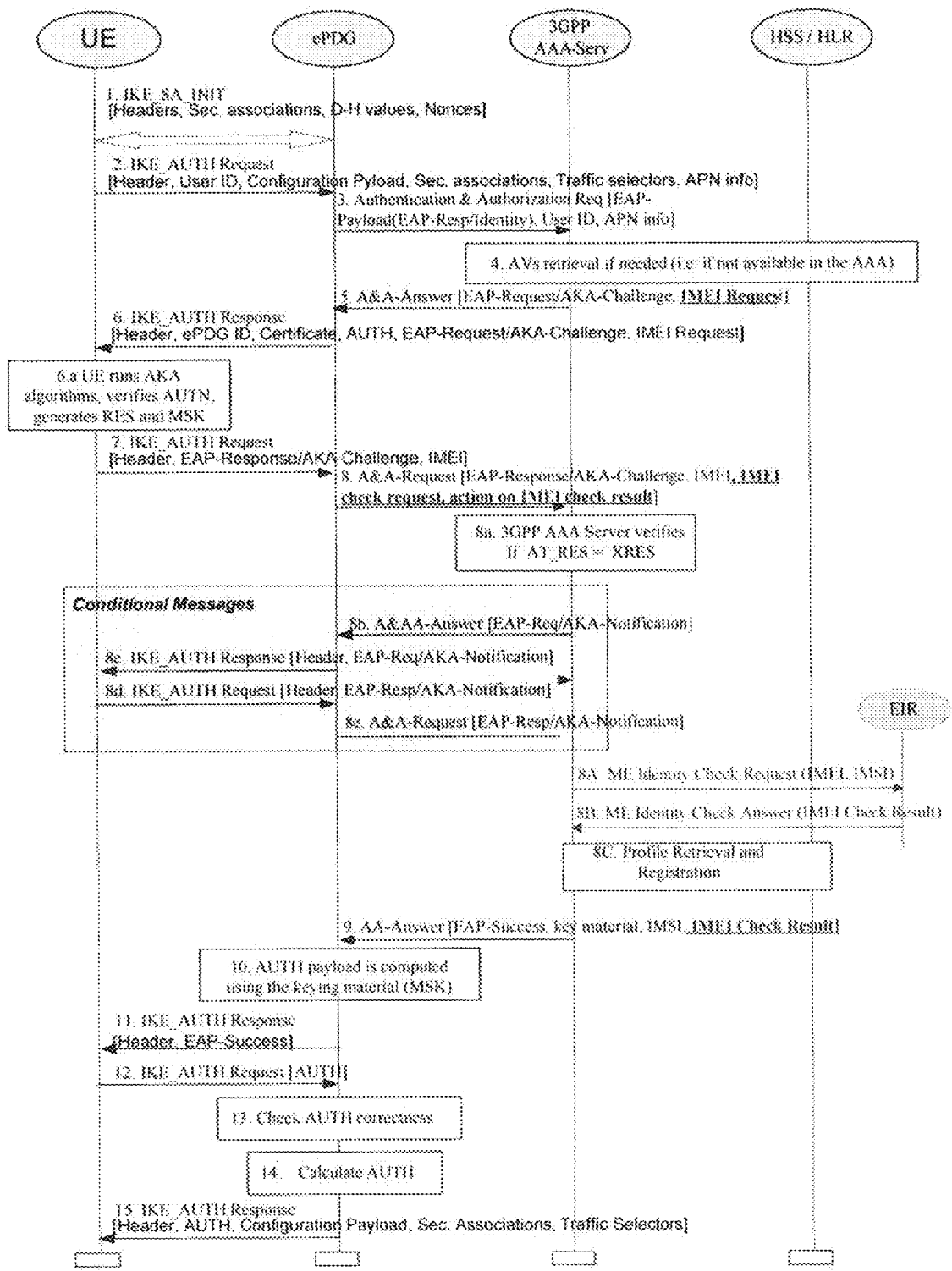
Figure 5:
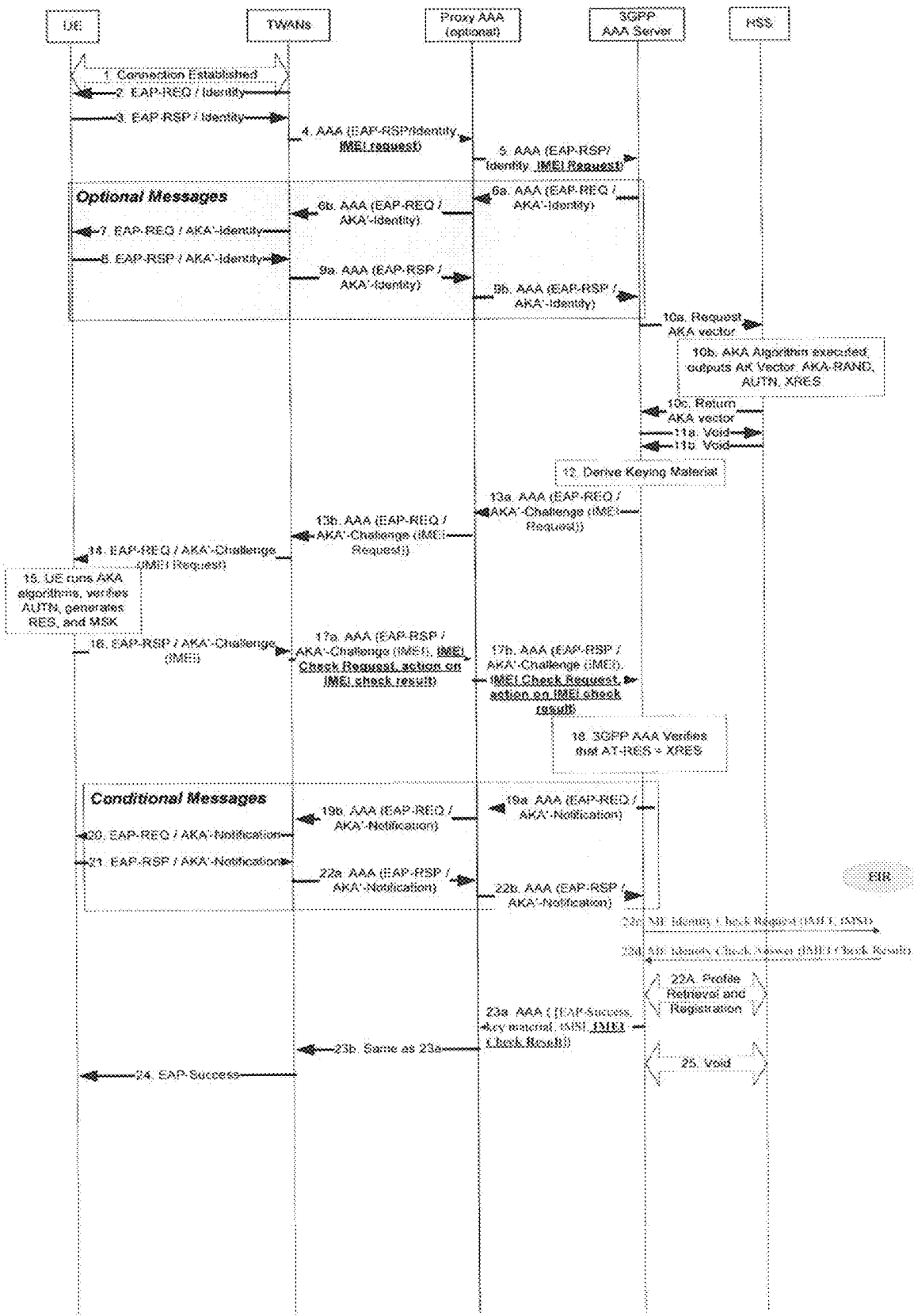
Figure 6:
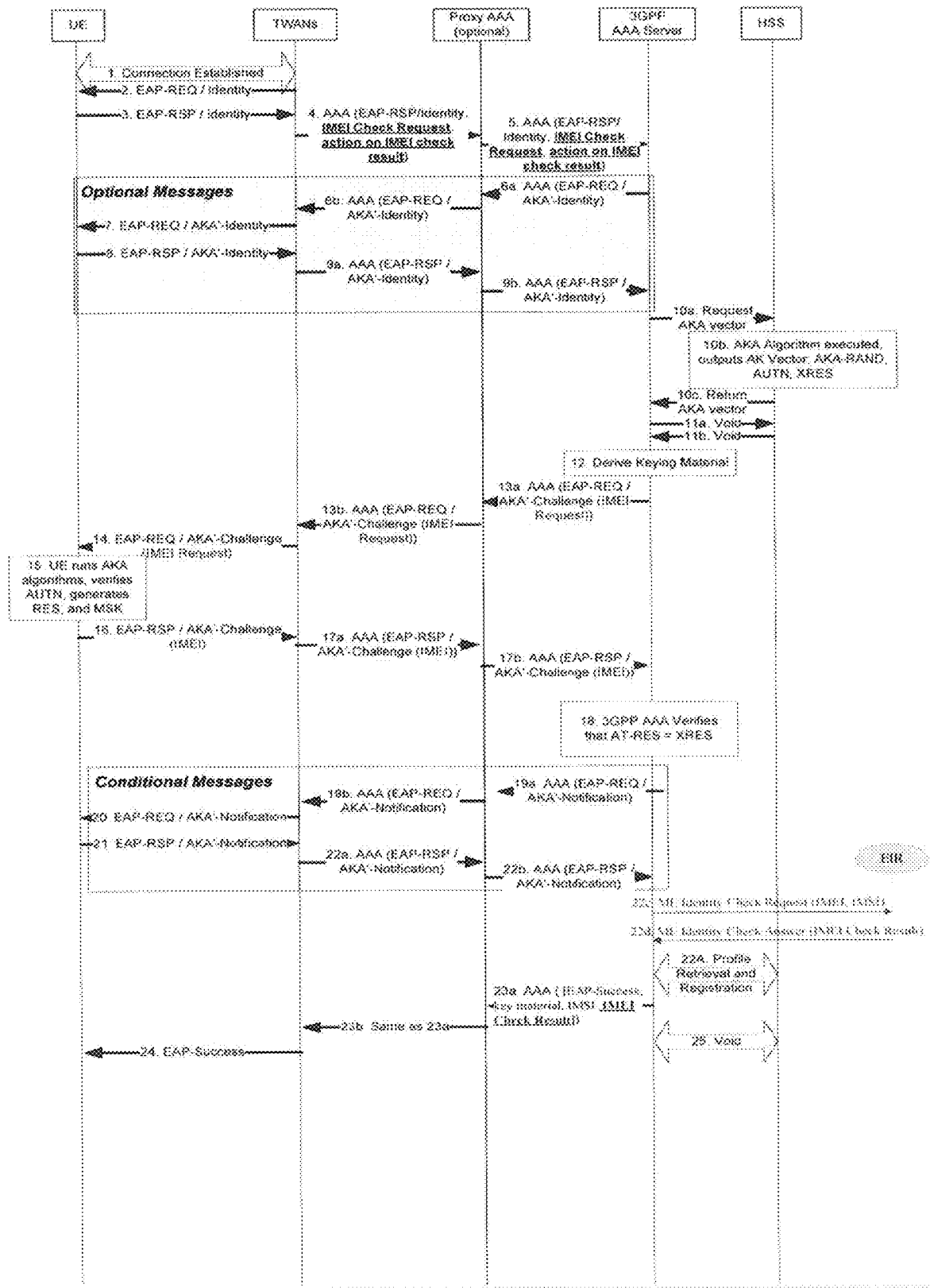
Figure 7:
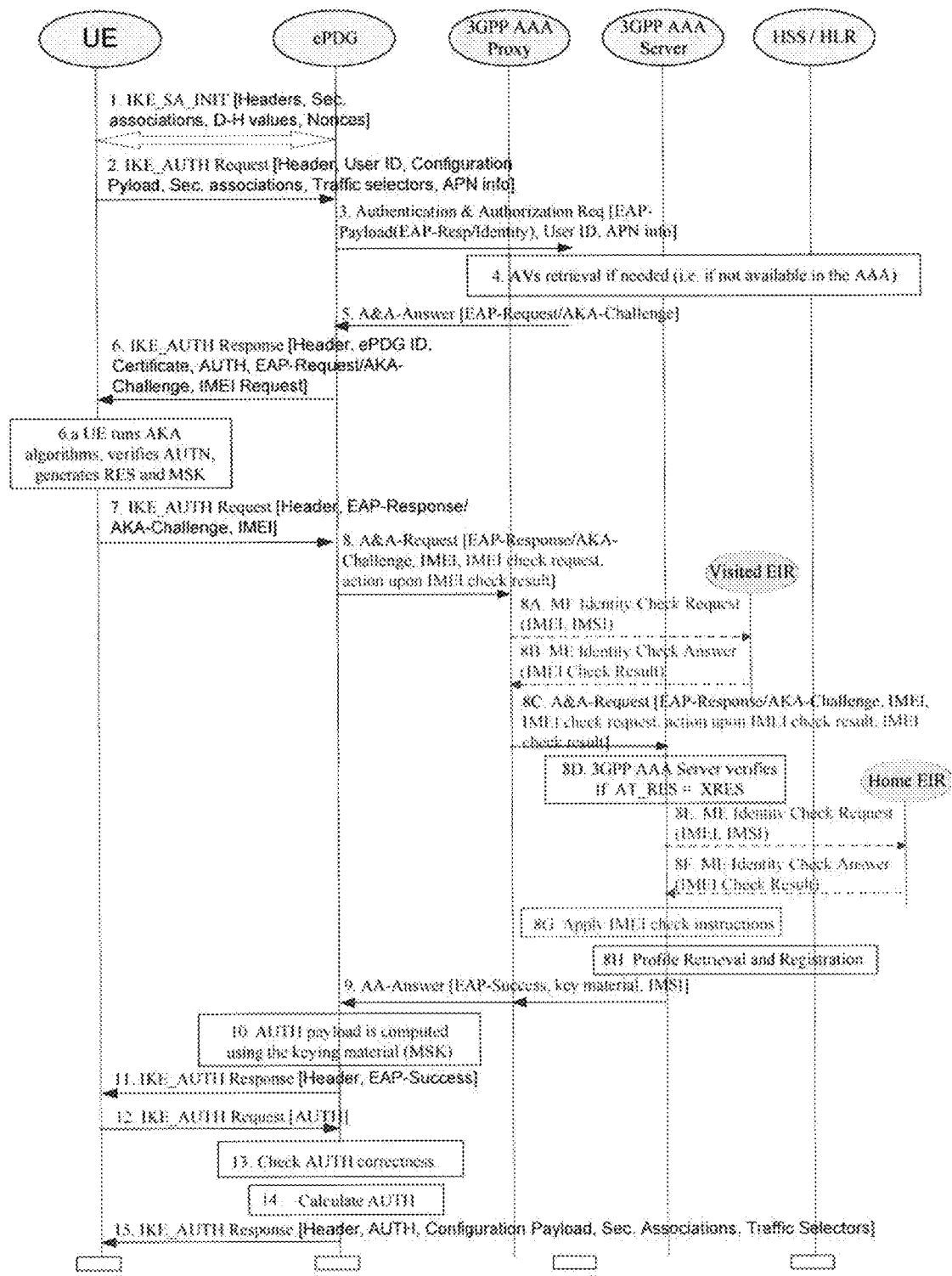
Figure 8:
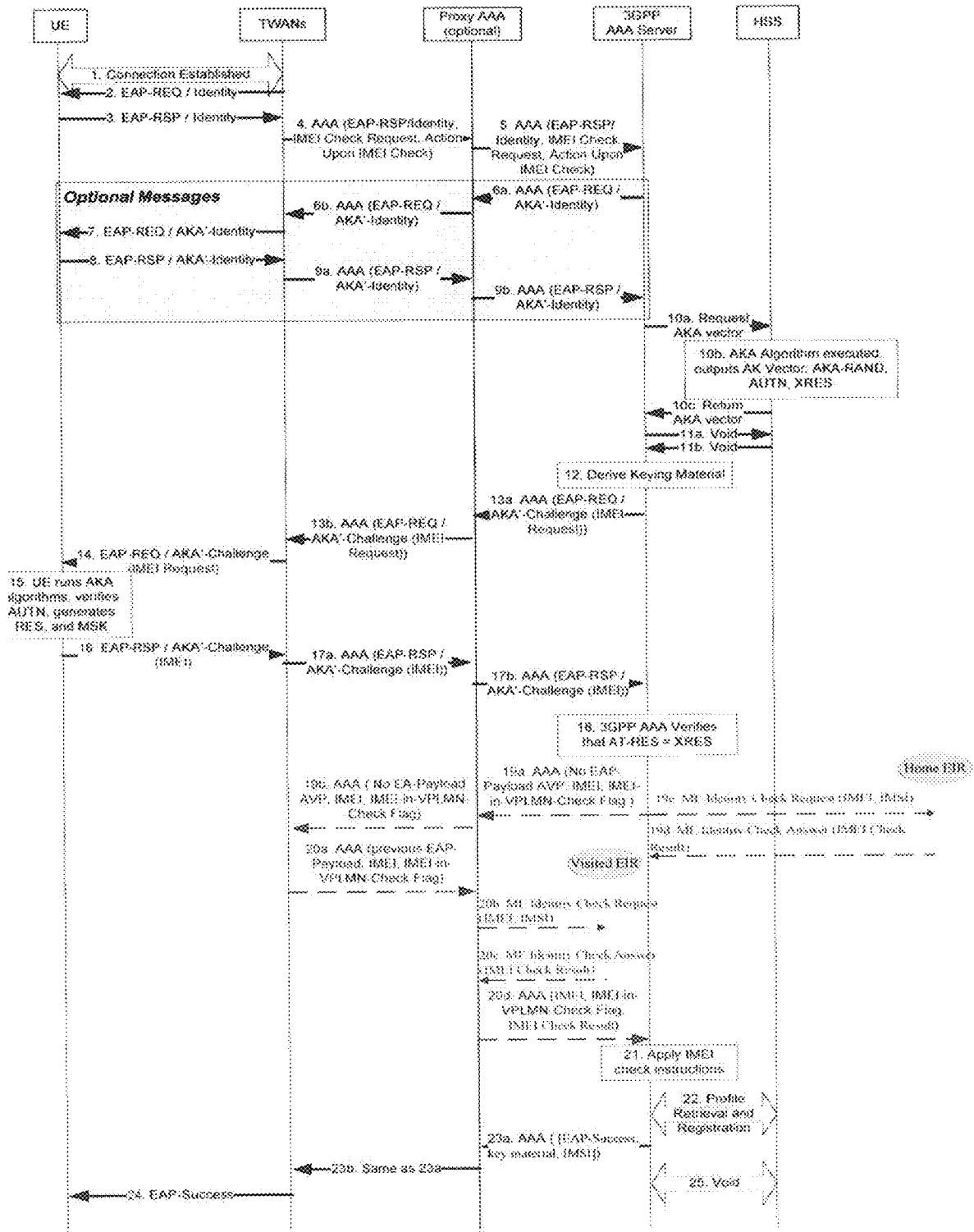
Figure 9:
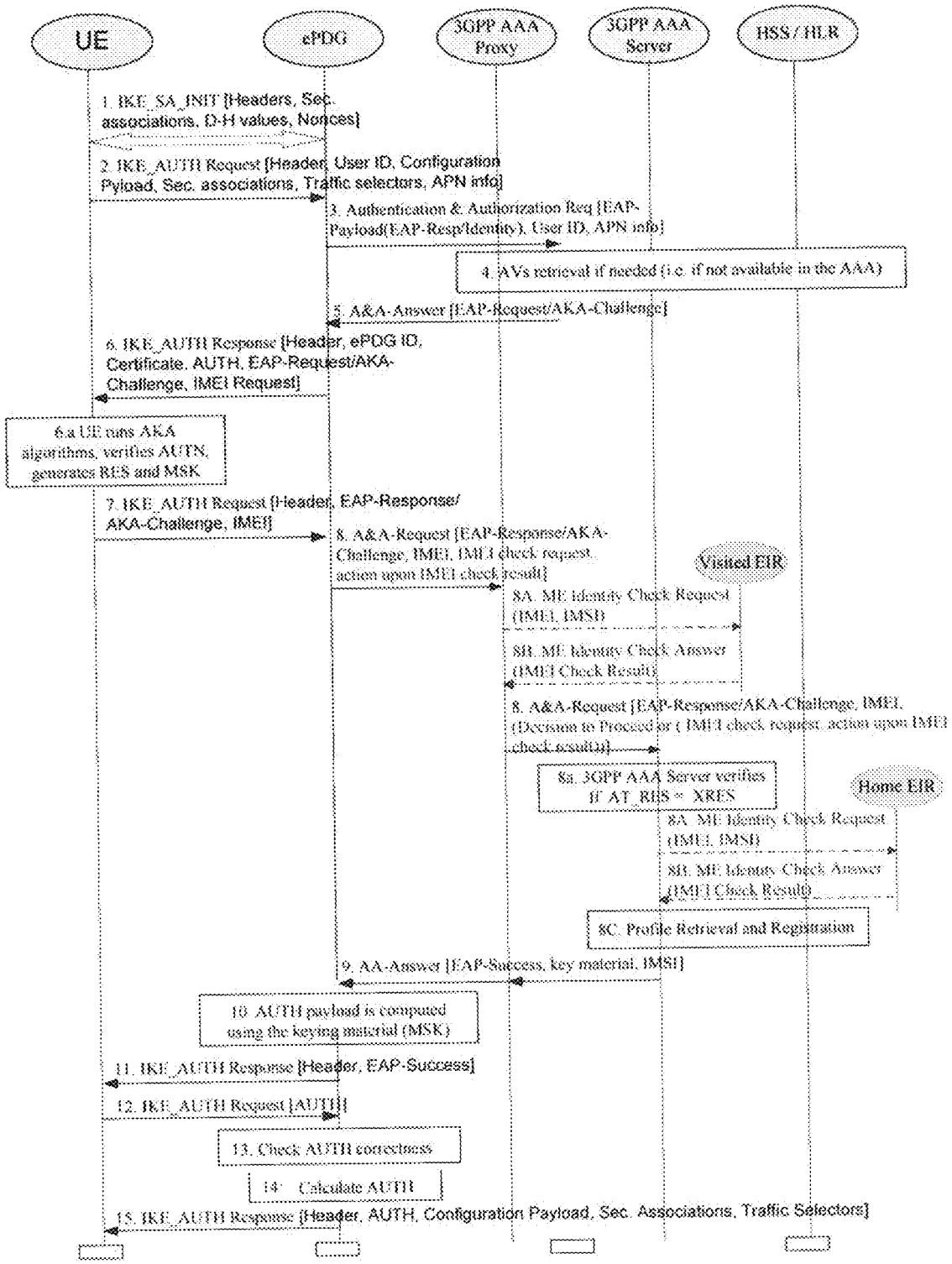
Figure 10:
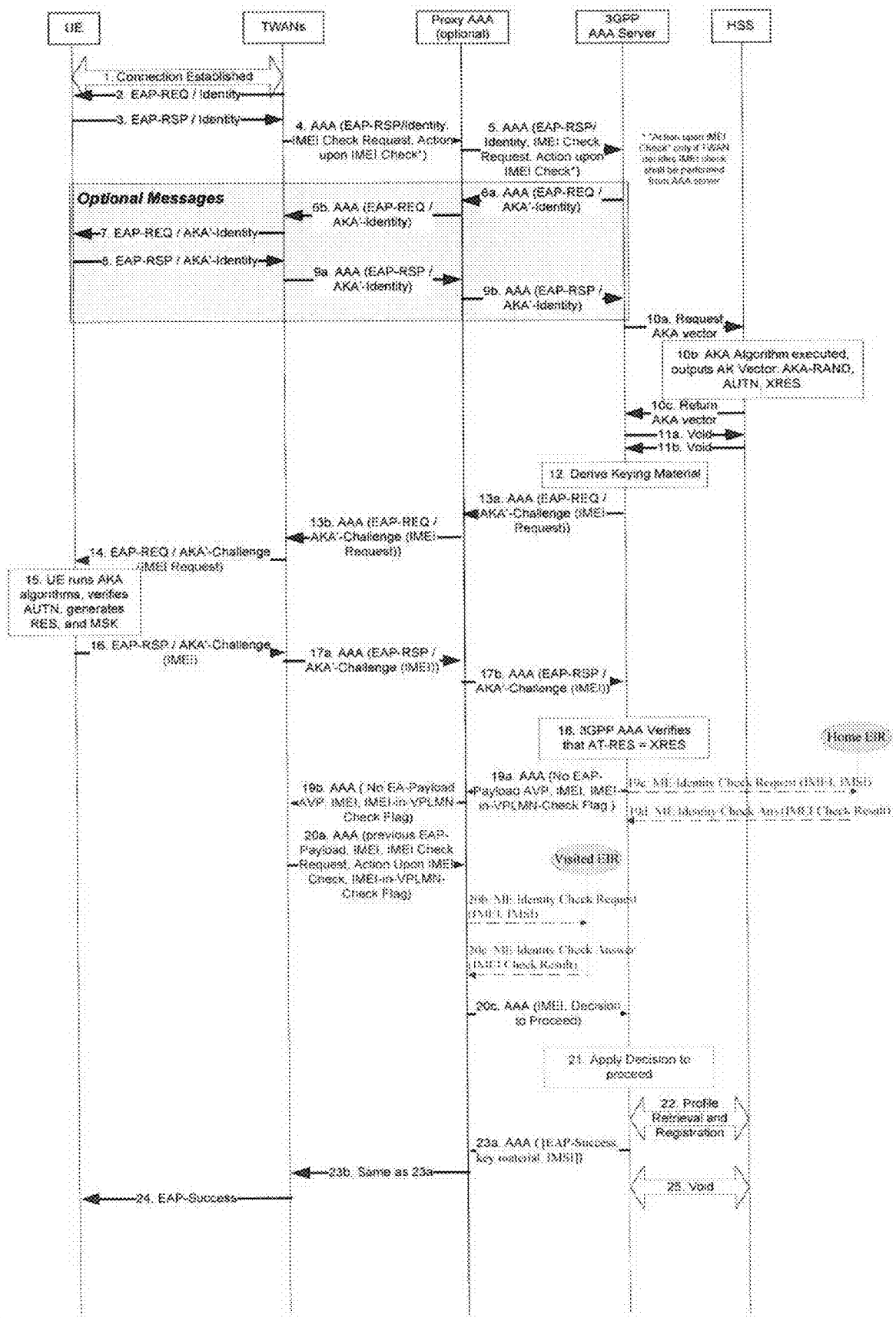

Some embodiments of apparatus and/or methods in accordance with embodiments of the present invention are now described, by way of example only, and with reference to the accompanying drawings, in which:

FIG. 1 is intended to recall an example of non-roaming architecture for 3GPP and Non 3GPP (Trusted or Untrusted) access to EPC, FIG. 2 is intended to recall an example of roaming architecture for 3GPP and Non 3GPP (Trusted or Untrusted) access to EPC, FIG. 3 is intended to illustrate an example of signaling flow for authentication and authorization procedure, for untrusted WLAN access to EPC, FIG. 4 is intended to illustrate a first example of signaling flow for authentication and authorization procedure including IMEI checking, for untrusted WLAN access to EPC, according to embodiments of the invention, FIG. 5 is intended to illustrate a second example of signaling flow for authentication and authorization procedure including IMEI checking, for trusted WLAN access to EPC, according to embodiments of the invention, FIG. 6 is intended to illustrate a third example of signaling flow for authentication and authorization procedure including IMEI checking, for trusted WLAN access to EPC, according to embodiments of the invention, FIG. 7 is intended to illustrate a fourth example of signaling flow for authentication and authorization procedure including IMEI checking, for untrusted WLAN access to EPC, according to embodiments of the invention, FIG. 8 is intended to illustrate a fifth example of signaling flow for authentication and authorization procedure including IMEI checking, for trusted WLAN access to EPC, according to embodiments of the invention, FIG. 9 is intended to illustrate a sixth example of signaling flow for authentication and authorization procedure including IMEI checking, for untrusted WLAN access to EPC, according to embodiments of the invention, FIG. 10 is intended to illustrate a seventh example of signaling flow for authentication and authorization procedure including IMEI checking, for trusted WLAN access to EPC, according to embodiments of the invention.

ABBREVIATIONS

AAA Authentication Authorization Accounting
AKA Authentication and Key Agreement
DEA Diameter EAP Answer
DER Diameter EAP Request
EAP Extensible Authentication Protocol
EPC Evolved Packet Core
ePDG Evolved Packet Data Gateway
EPS Evolved Packet System
HPLMN Home Public Land Mobile Network
HSS Home Subscriber Server
IMSI International Mobile Subscriber Identity
IMEI International Mobile Equipment Identity
IMS IP Multimedia Subsystem
LTE Long Term Evolution
PDN Packet Data Network
PDN GW PDN Gateway
PLMN Public Land Mobile Network
TWAN Trusted WLAN Access Network
UWAN Untrusted WLAN Access Network
UE User Equipment
HPLMN Visited Public Land Mobile Network
WLAN Wireless Local Area Network

DESCRIPTION OF VARIOUS ASPECTS AND/OR EMBODIMENTS OF THE INVENTION

IMEI(SV) checking is specified for 3GPP accesses for CS and PS domains in TS 23.002, TS 23.018, TS 23.060 and TS 23.401, as well as in appropriate stage 3 specifications. In order to check the IMEI(SV), the network needs to trigger the retrieval of the IMEI(SV) from the UE. NAS messages are specified for that. IMEI(SV) retrieval for non-3GPP accesses such as trusted and untrusted WLAN is specified but for such non-3GPP accesses IMEI(SV) checking in the EIR is not specified yet and a study is currently under progress in SA2 to define whether EIR should be interfaced to the TWAN (for trusted WLAN access) and to ePDG (for untrusted WLAN) or to the AAA server. All contributions up to now push for interfacing the EIR with the AAA server for various reasons, one reason being that the architecture would be common to both trusted and untrusted WLAN, another reason being that it reduces the number of interfaces to the EIR.

CT1 has recently agreed in CT1 two CRs that allow the network to retrieve the ME's IMEI(SV): 24.302 CR0460 for trusted WLAN and 24.302 CR0461 for untrusted WLAN. For the trusted WLAN case, the IMEI(SV) is retrieved from the UE by the AAA server (via EAP-AKA' new attribute AT_DEVICE_IDENTITY), while for the untrusted WLAN case the IMEI(SV) is retrieved from the UE by the ePDG (via a new IKEv2 attribute DEVICE_IDENTITY).

However, which entity should trigger the IMEI(SV) checking, and which entity should decide whether to continue the authorization process in case of black-listed, grey-listed or white-listed ME is not specified.

For non roaming PS sessions, the AAA server (in HPLMN) could be this entity. But for roaming sessions like emergency sessions, this might be in the VPLMN. The main reason is local regulatory policies which force the emergency sessions/calls to be handled by the VPLMN (or by the TWAN operator in the trusted WLAN access case) and thus to take decision on whether to accept emergency sessions issued by e.g. potentially stolen devices.

This would be in line with the mechanisms specified for the 3GPP accesses where the IMEI checking is fully performed in the VPLMN (by the MSC, SGSN, MME). See e.g. TS 23.401 clause 5.3.2.1, which specifies in step 5b:

"In order to minimise signalling delays, the retrieval of the ME Identity may be combined with NAS security setup in step 5a. The MME may send the ME Identity Check Request (ME Identity, IMSI) to the EIR. The EIR shall respond with ME Identity Check Ack (Result). Dependent upon the Result, the MME decides whether to continue with this Attach procedure or to reject the UE.

For an Emergency Attach, the IMEI check to the EIR may be performed. If the IMEI is blocked, operator policies determine whether the Emergency Attach procedure continues or is stopped."

In case of WLAN access to EPC, no solution is specified for triggering the IMEI(SV) checking and deciding whether to continue the Access authorization in case of in case of black-listed or grey-listed ME (Mobile Equipment) especially in case of roaming.

Only a partial solution for the HPLMN is disclosed:

For untrusted WLAN case, the ePDG retrieves the IMEI (SV) from the UE per TS 29.273 CR0422. This can be done at step 6 of the authentication procedure described in TS 33.402 clause 8.2.2. The ePDG sends the IKE_AUTH Response message to the UE together with the EAP Payload for AKA-Challenge, and the UE responds with its IMEI(SV) together with the EAP payload for AKA-Challenge in step 8 as specified by TS 24.302 CR0461. The IMEI(SV) is provided in step 8 to the AAA Server, which can then complete authentication and check IMEI in step 8a. No additional exchange with the AAA server is required.

FIG. 8.2.2-1 in clause 8.2.2 of TS 33.402 (Tunnel full authentication and authorization—untrusted access) has been updated (FIG. 3) for enabling IMEI checking by the AAA server.

Embodiments of the invention include first embodiments (examples of signaling flows being illustrated in FIGS. 4, 5, 6) and second embodiments (examples of signaling flows being illustrated in FIGS. 7, 8, 9, 10). FIGS. 4, 7, 9 are related to untrusted WLAN access. FIGS. 5, 6, 8, 10 are related to trusted WLAN access.

First embodiments allow in roaming scenarios the ePDG or TWAN operator to request IMEI checking using an EIR (Equipment Identity Register) via the AAA server in the Home PLMN.

Unfortunately, first embodiments are not applicable to all operators because, although some operators use a centralized EIR (e.g. the GSMA EIR), some other operators are willing to check the IMEI using an EIR that is local to their PLMN or to the country.

Second embodiments work for both types of operators.

Second embodiments, in addition to allowing in roaming scenarios the ePDG or TWAN operator to request IMEI checking using an EIR (Equipment Identity Register) via the AAA server in the Home PLMN, allow the ePDG or the TWAN operator to request IMEI checking using an EIR located in the VPLMN country and connected to the 3GPP AAA proxy.

1) First Embodiments

Embodiments of the invention include enhancing the above mechanism for IMEI(SV) checking, which only allows the ePDG to decide whether to retrieve the IMEI(SV) from the UE, to allow the 3GPP AAA server to instruct the ePDG to retrieve the IMEI(SV) from the UE.

Embodiments of the invention also include enhancing the above mechanism for IMEI(SV) checking, which only allows full IMEI checking procedure by the HPLMN, to allow the VPLMN or the TWAN operator to
- request to have IMEI checking performed
- decide on whether to continue or stop the authorization process depending on the result of IMEI checking e.g. in case of black-listed, grey-listed or white-listed ME although the IMEI checking is performed via the 3GPP AAA server in the HPLMN.

If it is required that the operator granting the access (VPLMN or TWAN operator) must decide whether to continue the Access authorization process in case of black-listed, grey-listed or white-listed ME (at least for emergency session with Local Break Out). Embodiments of the invention, allowing in particular to minimize the number of AAA server exchanges and the number of interfaces to the EIR include one or more of:
- In untrusted WLAN case, after it receives the IKE_AUTH Request from the UE, the ePDG may add an "IMEI check request" indication in the subsequent Authentication & Authorization Request (Diameter DER) message to the AAA server.
- As the AAA server in HPLMN may want to carry out an IMEI check, it needs to ensure that the IMEI is requested from the UE. In TWAN case it is the AAA server that requests the IMEI from the UE. In the untrusted WLAN case, it is the ePDG that requests the IMEI from the UE. Thus the AAA server needs to be able to instruct the ePDG to retrieve the IMEI from the UE: in the untrusted WLAN case, the AAA server may add an "IMEI-request" indicator in the signaling to the ePDG.
- In trusted WLAN case, after it receives the first EAP-RSP/Identity message from the UE, the TWAN may add an "IMEI check request" indication in the subsequent Authentication & Authorization Request (Diameter DER) message to the AAA server.
- Then in both trusted and untrusted WLAN cases, the AAA server would request the EIR to check the IMEI.

To allow the ePDG/TWAN to decide whether the call setup should continue or should be stopped, it is proposed to add another indication "action on IMEI check result" in the DER message. The Authentication & Authorization Answer (Diameter DEA) message would also contain a indication "IMEI check result" in order to inform the ePDG/TWAN whether the authorization for the emergency call was given to a user that uses a black-listed, grey-listed or white-listed ME. The ePDG/TWAN may then decide e.g. to inform the local authorities. This is depicted in the following two call flows.

"action on IMEI check result" provides the AAA server with instructions on whether to continue or to stop the authorization process to the UE for each of the IMEI check result values provided by the EIR i.e. black-listed ME, grey-listed ME and white-listed ME. In the case of a trusted WLAN access, the instructions may also only allow to continue the authorization process for an emergency session (the UE indicates this is an emergency session in EAP signalling to the 3GPP AAA server, and the TWAN is not aware whether the authentication and authorization procedure initiated by the UE is to setup an emergency session till much later in the call flow).

In FIGS. 4 to 6, in steps associated with the IMEI check procedure, text associated with mechanisms part of embodiments of the invention is shown underlined.

Untrusted WLAN

An example of call flow in case of Untrusted WLAN is depicted in FIG. 4. The IMEI retrieval has been recently agreed at 3GPP (i.e. IMEI Request parameter in step 6, IMEI parameter and the steps 8b and 8c in the figure). The addition of IMEI Request in step 5, IMEI Check Request and Action on IMEI Check Result (black-listed, grey-listed or white-listed ME) are part of embodiments of the invention.

Notes
- The parameter "Action on IMEI check result" contains the action (Stop, Continue) for the case of regular attach/session requests and the action for the case of emergency attach/session requests. Or it may contain a single action (Stop, Continue, Continue Only for an emergency session)
- the call flow (AA-answer in step 9 contains EAP-Success) depicts the case where the terminal was detected by the EIR check as not black/grey listed or where the "Action on IMEI Check Result" was "Continue"
- In case where the terminal would be detected by the EIR check as black/grey listed and where the corresponding "Action on IMEI Check Result" would not be "Continue", the AA-answer in step 9 would contain an EAP-rejection.
- In both cases, if the "IMEI Check Result" indicates that the terminal was detected by the EIR check as black/grey listed, the ePDG may log information and inform the local authorities.

Trusted WLAN

An example of signaling flow related to a possible solution in case of Trusted WLAN is depicted in FIG. 5.

The IMEI retrieval has been recently agreed at 3GPP (i.e. IMEI Request parameter, IMEI parameter and the steps 22c and 22d in the figure).

The addition of IMEI Request in steps 4 and 5, IMEI Check Request and Action on IMEI Check Result (black-listed, grey-listed or white-listed ME) are part of embodiments of the invention.

Notes:
The parameter "Action on IMEI check result" may contain the action (Stop, Continue) for the case of regular attach/session requests and the action for the case of emergency attach/session requests. Or it may contain a single action (Stop, Continue, Continue Only for an emergency session).

IMEI Request parameter in steps 4 and 5 is intended to request the AAA server to retrieve the IMEI(SV) from the UE and to return it to the TWAN. The absence of this parameter does not preclude the AAA server to decide the retrieval of the IMEI(SV) from the UE and to provide it to the TWAN.

An alternative solution includes requesting IMEI Check as soon as possible i.e. in the EAP-RSP/Identity in step 4. An example of a corresponding call flow is depicted in FIG. 6.

The addition of IMEI Check Request and Action on IMEI Check Result (black-listed, grey-listed or white-listed ME) is part of embodiments of the invention.

Notes
The parameter "Action on IMEI check result" may contain the action (Stop, Continue) for the case of regular attach/session requests and the action for the case of emergency attach/session requests. Or it may contain a single action (Stop, Continue, Continue Only for an emergency session).

the "IMEI Request" in steps 4 and 5 of the other alternative (intended to request the AAA server to retrieve the IMEI(SV) from the UE and to return it to the TWAN) could also be used in this alternative in case the TWAN wants to trigger the acquisition of the IMEI for other purposes than EIR check.

the call flow (AA-answer in step 23 contains EAP-Success) depicts the case where the terminal was detected by the EIR check as not e.g. black or grey listed or where the "Action on IMEI Check Result" was "Continue".

In case the terminal would be detected by the EIR check as e.g. black or grey listed and where the corresponding "Action on IMEI Check Result" would not be "Continue", the AA-answer in step 23 would contain an EAP-rejection.

In both cases, if the "IMEI Check Result" indicates that the terminal was detected by the EIR check as black/grey listed, the TWAN may log information and inform the local authorities.

2) Second Embodiments

Embodiments of the invention allow the handling of IMEI checking assuming two cases i.e. where the EIR is in the visited country and where the EIR is in the home country. It is also assumed that the AAA server/proxy is interfaced with the EIR.

It is assumed that the EIR (specified in particular in TS 23.002) is interfaced with the AAA server (or proxy) and not directly to the ePDG/TWAN to minimize the number of interfaces and to avoid the duplication of the procedures in ePDG and TWAN.

As already indicated, the non-roaming case mechanism is straight forward, but the roaming case requires more analysis.

For 3GPP access, TS 23.401 clause 5.3.2.1 specifies in step 5*b*: "In order to minimise signalling delays, the retrieval of the ME Identity may be combined with NAS security setup in step 5*a*. The MME may send the ME Identity Check Request (ME Identity, IMSI) to the EIR. The EIR shall respond with ME Identity Check Ack (Result). Dependent upon the Result, the MME decides whether to continue with this Attach procedure or to reject the UE." Therefore, for 3GPP access, the decision for triggering the IMEI check procedure, as well as the decision for continuing the procedure is performed in the VPLMN.

Moreover, depending on local regulations, the EIR may be located in the visited country (local EIR, not always synchronized with an EIR outside the country) or centralized (e.g. GSMA EIR). The solution should work with both alternatives.

In embodiments of the invention, the operator who is granting the access (i.e. the VPLMN or the TWAN operator) takes the responsibility of the action plan i.e.
determining whether to trigger IMEI checking,
determining (via e.g. operator configuration) whether the EIR to be used is in the local country or in the home country, and
deciding whether to continue the authorization process in case of black-listed, grey-listed or white-listed UE (at least for emergency session with Local Break Out).

In the untrusted WLAN case, the ePDG can retrieve the IMEI from the UE on its own. It is not the case for trusted WLAN case, in which only the 3GPP AAA server can do that. Hence, the solutions for untrusted WLAN and for trusted WLAN will necessarily be different.

Examples of signaling flows allowing in particular to minimize the number of AAA exchanges are illustrated in FIGS. 7 to 10.

Examples of signaling flows illustrated in FIGS. 7 (untrusted WLAN) and 8 (trusted WLAN) are first described.

Untrusted WLAN

For untrusted WLAN, an example of signaling allowing to keep the same number of 3GPP AAA exchanges is illustrated in FIG. 7:
After it receives the IKE_AUTH Request from the UE, the ePDG first decides to retrieve the IMEI from the UE (step 6 of FIG. 7). In order to allow the 3GPP AAA proxy or server to check the IMEI via the EIR, the ePDG just has to add the following parameters in the subsequent Authentication & Authorization Request DER Diameter message to the 3GPP AAA server (step 8 of FIG. 7):
the IMEI retrieved from the UE (part of Terminal Information IE in Authentication and Authorization Request message),
an "IMEI check request" parameter that indicates whether the IMEI shall be checked by the visited country EIR, or by the home country EIR. The absence of this parameter indicates that IMEI check should not be performed.

The ePDG also has to decide whether the authorization process should continue or should be stopped depending on the IMEI check result. Hence it is proposed to add another parameter "Action upon IMEI check" indicating whether the 3GPP AAA server shall continue or stop the authentication and authorization procedure for each of the potential IMEI check results from the EIR (e.g. unknown, black listed, grey listed, white listed).

The 3GPP AAA Proxy always forwards the "Action upon IMEI check" and "IMEI check request" parameters to the 3GPP AAAA server. In addition, if the "IMEI check request" parameter indicates the visited country EIR, the 3GPP AAA proxy will then request the EIR to check the IMEI and to provide the "IMEI check result" returned by the EIR to the 3GPP AAA server (step 8c in FIG. 7).

If the "IMEI check request" parameter indicates the home country EIR, the 3GPP AAA server requests the EIR to check the IMEI.

Based on "Action upon IMEI check" and "IMEI check result" returned by the visited or home EIR, the AAA server determines whether the authentication and authorization procedure shall continue or shall be stopped.

Trusted WLAN

For trusted WLAN, an example of signaling flow which may require one more 3GPP AAA exchange is illustrated in FIG. 8. When the EIR is in the visited country, the TWAN cannot immediately provide the IMEI to the 3GPP AAA proxy. Hence, it may be necessary to have a preliminary step where the TWAN asks the 3GPP AAA server to retrieve the IMEI and to return it to the TWAN, before the 3GPP AAA proxy can check the IMEI via the local country EIR:

After it receives the first EAP-RSP/Identity message from the UE, the TWAN adds to the subsequent Authentication & Authorization Request DER Diameter message to the 3GPP AAA server (via the 3GPP AAA Proxy in roaming cases) (steps 4 and 5 in FIG. 8):

The "IMEI check request" parameter indicates whether the IMEI shall be checked by the visited country EIR, or by the home country EIR. The absence of this parameter indicates that IMEI check should not be performed;

The "Action upon IMEI check" parameter indicates whether the 3GPP AAA server shall continue or stop the authentication and authorization procedure for each of the potential IMEI check results from the EIR (e.g. unknown, black listed, grey listed, white listed);

If the 3GPP AAA server receives the "IMEI check request" parameter from a TWAN, it shall perform the IMEI retrieval (step 13 to 17 in FIG. 8).

After the 3GPP AAA server has retrieved the IMEI,

If the "IMEI check request" parameter indicates the visited country EIR, the 3GPP AAA server shall return the IMEI to the TWAN in a new AAA-TWAN DEA Diameter message with EAP-Payload AVP absent, with the result code set to DIAMETER_MULTI_ROUND_AUTH and with a new "IMEI-in-VPLMN-Check" flag set to 1 in the DEA-Flags AVP (same mechanism as specified in TS 29.273 for TWAN SCM mode) (steps 19a and 19b in FIG. 8);

If the "IMEI check request" parameter indicates the home country EIR, the 3GPP AAA server requests the EIR to check the IMEI (steps 19c and 19d in FIG. 8);

If no IMEI check was required, the 3GPP AAA server should/may still provide the IMEI to the TWAN if available. This may be done via any message other than step 19a/19b, e.g. in step 23a/23b or any other intermediate message not shown in FIG. 8.

If the TWAN receives the above AAA-TWAN DEA Diameter message with the "IMEI-in-VPLMN-Check" flag set to 1, The TWAN re-issues a new DER command via the 3GPP AAA Proxy including the last EAP-Payload sent in the previous request, together with the "IMEI-in-VPLMN-Check" flag set to 1 in the DER-Flags AVP and the IMEI (step 20a in FIG. 8);

The 3GPP AAA Proxy requests the EIR to check the IMEI and forwards the "IMEI check result" returned by the EIR to the AAA server (steps 20b to 20d in FIG. 8).

The AAA server applies the IMEI check instructions received in the "Action upon IMEI check" i.e., based on the "Action upon IMEI check" and on the "IMEI check result" from the visited or home EIR, determines whether the authentication and authorization procedure shall continue or shall be stopped (step 21 in FIG. 8).

Examples of signaling flows illustrated in FIGS. 9 (untrusted WLAN access) and 10 (trusted WLAN access) are now described.

Untrusted WLAN

For untrusted WLAN, an example of signaling flow allowing to keep the same number of 3GPP AAA exchanges is illustrated in FIG. 9:

After it receives the IKE_AUTH Request from the UE, the ePDG first decides to retrieve the IMEI from the UE (step 6 of FIG. 9). In order to allow the 3GPP AAA proxy or server to check the IMEI via the EIR, the ePDG just has to add the following parameters in the subsequent Authentication & Authorization Request DER Diameter message to the 3GPP AAA server (step 8 of FIG. 9):

the IMEI retrieved from the UE (already existing and part of Terminal Information IE in Authentication and Authorization Request message)

an "IMEI check request" parameter that indicates whether the IMEI shall be checked by the visited country EIR, or by the home country EIR. The absence of this parameter indicates that IMEI check should not be performed.

The ePDG also has to decide whether the authorization process should continue or should be stopped depending on the IMEI check result. Hence it is proposed to add another parameter "Action upon IMEI check" indicating whether the 3GPP AAA server or AAA proxy shall continue or stop the authentication and authorization procedure for each of the potential IMEI check results from the EIR (e.g. unknown, black listed, grey listed, white listed).

If the "IMEI check request" parameter indicates the visited country EIR, the 3GPP AAA proxy will then have to request the EIR to check the IMEI and, based on the "Action upon IMEI check" provided by the ePDG, will determine whether the authentication and authorization procedure shall continue or shall be stopped. This indication will be provided to the 3GPP AAA server via the "Decision to Proceed" parameter.

NOTE: An alternative could be that, instead of computing and sending the "Decision to Proceed" parameter, the 3GPP AAA Proxy signals to the 3GPP AAA server the result of the IMEI check (e.g. black, white . . . ) together with the "action upon IMEI check" parameter, leaving the 3GPP AAA server in the HPLMN behaving in a similar manner than if it did the IMEI check itself towards an EIR in the HPLMN.

If the "IMEI check request" parameter indicates the home country EIR, the 3GPP AAA proxy forwards the ePDG request unchanged to the 3GPP AAA server.

Trusted WLAN

For trusted WLAN, an example of signaling flow which may require one more 3GPP AAA exchange is illustrated in FIG. 10. When the EIR is in the visited country, the TWAN cannot immediately provide the IMEI to the 3GPP AAA proxy. Hence, it may be necessary to have a preliminary step where the TWAN asks the 3GPP AAA server to retrieve the IMEI and to return it to the TWAN, before the 3GPP AAA proxy can check the IMEI via the local country EIR:

After it receives the first EAP-RSP/Identity message from the UE, the TWAN just have to add the "IMEI check request" parameter in the subsequent Authentication & Authorization Request DER Diameter message to the 3GPP AAA server (step 4 of FIG. 10). If the "IMEI check request" parameter indicates the home country EIR, the parameter "Action upon IMEI check" is also added.

If the 3GPP AAA server receives the "IMEI check request" parameter from a TWAN, it shall perform the IMEI retrieval.

After IMEI retrieval:
If the "IMEI check request" parameter indicates the visited country EIR, the 3GPP AAA server returns the IMEI to the TWAN and postpones the final decision on Authentication and Authorization until explicit indication from the TWAN or the 3GPP AAA proxy (see further steps).

If the "IMEI check request" parameter indicates the home country EIR, the 3GPP AAA server requests the EIR to check the IMEI (steps 19c and 19d in FIG. 10);

After the 3GPP AAA server has retrieved the IMEI and if the "IMEI check request" parameter indicates the visited country EIR, it shall return it to the TWAN in a new AAA-TWAN DEA Diameter message with EAP-Payload AVP absent, with the result code set to DIAMETER_MULTI_ROUND_AUTH and with a new "IMEI-in-VPLMN-Check" flag set to 1 in the DEA-Flags AVP (same mechanism as specified in TS 29.273 for TWAN SCM mode).

The TWAN then re-issues a new DER command including the last EAP-Payload sent in the previous request, together with the "IMEI-in-VPLMN-Check" flag set to 1 in the DER-Flags AVP, the IMEI, the "IMEI check request" parameter and the "Action upon IMEI check" parameter.

The "IMEI check request" parameter indicates that the IMEI shall be checked by the visited country EIR The "Action upon IMEI check" parameter indicates whether the 3GPP AAA server or AAA proxy shall continue or stop the authentication and authorization procedure for each of the potential IMEI check results from the EIR (e.g. unknown, black listed, grey listed, white listed).

The "IMEI-in-VPLMN-Check" flag set to 1 in the DER-Flags AVP indicates to the AAA server that the EAP-Payload can be discarded since already sent in previous DER (same principle as for TS 29.273 for TWAN SCM mode).

When the TWAN receives the IMEI from the 3GPP AAA server, the process continues in the same way as in the ePDG case:

If the "IMEI check request" parameter indicates the visited country EIR, the 3GPP AAA proxy requests the EIR to check the IMEI and, based on the "Action upon IMEI check", determines whether the authentication and authorization procedure shall continue or shall be stopped. This indication is provided to the 3GPP AAA server via the "Decision to proceed" parameter.

Various aspects and/or embodiments of the invention include (though not being limited to) following aspects and/or embodiments.

Some aspects are related to an entity, such as ePDG or TWAN entity, capable of serving a User Equipment for WLAN access to a Packet Core such as EPC of a mobile network.

Various embodiments are provided, including (though not being limited to) following embodiments, which may be taken alone or in combination, according to various combinations.

In an embodiment said entity such as ePDG or TWAN entity is configured to:
provide at least one of:
an indication whether IMEI checking is requested,
an indication whether IMEI checking by a visited EIR or by a home EIR is requested,
an indication of an action to be taken upon IMEI check result.

In an embodiment, said entity such as ePDG is configured to:
provide at least one of said indications in a A&A-Request [EAP-Response/AKA Challenge] message.

In an embodiment, said entity such as TWAN entity is configured to:
provide at least one of said indications in a A&A-Request (EAP-RSP/Identity) message.

In an embodiment, said entity such as TWAN entity is configured to:
upon reception in a AAA message of a request to trigger the checking by a visited EIR of a retrieved IMEI, send a subsequent A&A-Request message triggering said checking.

In an embodiment, said entity such as TWAN entity is configured to:
upon reception of a AAA message with no EAP Payload and including the IMEI and a "IMEI-in-VPLMN-Check" flag indicating IMEI checking in a visited PLMN, send a subsequent A&A-Request message containing a previously sent EAP Payload, the IMEI, and the "IMEI-in-VPLMN-Check" flag.

In an embodiment, said entity such as TWAN entity is configured to:
upon reception in a AAA message of a request to trigger the checking by a visited EIR of a retrieved IMEI, send a subsequent A&A-Request message triggering said checking and providing at least one of said indications.

In an embodiment, said entity such as TWAN entity is configured to:
upon reception of a AAA message with no EAP Payload and including the IMEI and a "IMEI-in-VPLMN-Check" flag indicating IMEI checking in a visited PLMN, send a subsequent AAA message containing a previously sent EAP Payload, the IMEI, at least one of said indications, and the "IMEI-in-VPLMN-Check" flag.

In an embodiment, said entity such as TWAN entity is configured to:
send a A&A Request (EAP-RSP/Identity) message including a request for IMEI retrieval.

Other aspects are related to an entity such as a 3GPP AAA Proxy, respectively a 3GPP AAA Server.

In an embodiment, an entity such as 3GPP AAA Proxy, respectively 3GPP AAA Server, is configured to:
perform at least one step related to IMEI checking, based on at least one indication from an entity, such as ePDG or TWAN entity, capable of serving a User Equipment for WLAN access to a Packet Core such as EPC of a mobile network, among:
an indication whether IMEI checking is requested,
an indication whether IMEI checking by a visited EIR or by a home EIR is requested,
an indication of an action to be taken upon IMEI check result.

In an embodiment, an entity such as 3GPP AAA Proxy is configured to:
receive at least one of said indications from a ePDG in a A&A-Request [EAP-Response/AKA Challenge] message.

In an embodiment, an entity such as 3GPP AAA Proxy is configured to perform at least one of:
forward at least one of said indications to a 3GPP AAA Server,
if IMEI checking by a visited EIR is requested, forward to a 3GPP AAA Server an IMEI check result returned by the visited EIR.

In an embodiment, an entity such as 3GPP AAA Proxy is configured to perform at least one of:
if IMEI checking by a home EIR is requested, forward at least one of said indications to a 3GPP AAA Server,
if IMEI checking by a visited EIR is requested, forward to a 3GPP AAA Server an IMEI check result returned by the visited EIR In an embodiment, an entity such as 3GPP AAA Proxy is configured to perform at least one of:
forward to a TWAN entity in a AAA message a request from a 3GPP AAA Server to trigger the checking by a visited EIR of a retrieved IMEI,
upon reception from the TWAN entity of a subsequent A&A Request message triggering said checking, forward to a 3GPP AAA Server an IMEI check result returned by the visited EIR.

In an embodiment, an entity such as 3GPP AAA Proxy is configured to:
upon reception from a TWAN entity of a A&A Request message with a previous EAP Payload and including the IMEI and a "IMEI-in-VPLMN-Check" flag indicating IMEI checking in a visited PLMN, send to the 3GPP AAA Server a subsequent A&A Request message containing a previous EAP Payload, the IMEI, the "IMEI-in-VPLMN-Check" flag, and the IMEI check result.

In an embodiment, an entity such as 3GPP AAA Proxy is configured to perform at least one of:
forward to a TWAN entity in a AAA message a request from a 3GPP AAA Server to trigger the checking of a retrieved IMEI,
upon reception from a TWAN entity of a subsequent A&A Request message triggering the checking of a retrieved IMEI and including at least one of said indications, send to a 3GPP AAA Server in a A&A Request message one of: said at least one indication if IMEI checking by a home EIR is requested, or a decision upon IMEI check result made by the 3GPP AAA Proxy, if IMEI checking by a visited EIR is requested.

In an embodiment, an entity such as 3GPP AAA Server is configured to:
receive said at least one indication from a ePDG in a A&A-Request [EAP-Response/AKA Challenge] message.

In an embodiment, an entity such as 3GPP AAA Server is configured to perform at least one of:
receive an IMEI check result from a 3GPP AAA Proxy,
make a decision upon IMEI check result, based on said indication of an action to be taken upon IMEI check result, and on one of: a IMEI check result from the home EIR if IMEI checking by a home EIR is requested, or a IMEI check result received from the visited EIR.

In an embodiment, an entity such as 3GPP AAA Server is configured to perform at least one of:
make a decision upon IMEI check result, based on said indication of an action to be taken upon IMEI check result, and on a IMEI check result from the home EIR if IMEI checking by a home EIR is requested,
receive a decision upon IMEI check result made by the 3GPP AAA Proxy if IMEI checking by a visited EIR is requested.

In an embodiment, an entity such as 3GPP AAA Server is configured to:
receive said at least one indication from a TWAN entity in a A&A Request (EAP-RSP/Identity) message.

In an embodiment, an entity such as 3GPP AAA Server is configured to perform at least one of:
if IMEI checking by a home EIR is requested, request the home EIR to check the IMEI,
if IMEI checking by a visited EIR is requested, send in a AAA message a request to a TWAN entity to trigger the checking of a retrieved IMEI by a visited EIR.

In an embodiment, an entity such as 3GPP AAA Server is configured to:
send said AAA message with no EAP Payload and including the IMEI and a "IMEI-in-VPLMN-Check" flag indicating IMEI checking in a visited PLMN.

In an embodiment, an entity such as 3GPP AAA Server is configured to perform at least one of:
receive an IMEI check result in a A&A Request message from a 3GPP AAA Proxy,
make a decision upon IMEI check result based on said indication of an action to be taken upon IMEI check result and on one of: IMEI check result from the home EIR if IMEI checking by a home EIR is requested, or IMEI check result from the visited EIR.

In an embodiment, an entity such as 3GPP AAA Server is configured to:
after IMEI retrieval, send in a AAA message a request to a TWAN entity to trigger the checking of the retrieved IMEI.

In an embodiment, an entity such as 3GPP AAA Server is configured to:
send said AAA message with no EAP Payload and including the IMEI and a "IMEI-in-VPLMN-Check" flag indicating IMEI checking in a visited PLMN.

In an embodiment, an entity such as 3GPP AAA Server is configured to perform at least one of:
receive in a A&A Request message one of: a decision upon IMEI check result made by a 3GPP AAA Proxy based on an IMEI check result from a visited EIR, or said indication of an action to be taken upon IMEI check result,
make a decision upon IMEI check result, based on said indication of an action to be taken upon IMEI check, and on a IMEI check result from a home EIR if IMEI checking by a home EIR is requested.

Other aspects are related to a method for support of IMEI checking for WLAN access to a Packet Core such as EPC of a mobile network, said method comprising at least one step performed by at least one of such entities (entity such as ePDG or TWAN entity capable of serving a User Equipment for WLAN access to a Packet Core such as EPC of a mobile network, and entity such as 3GPP AAA Proxy or 3GPP AAA Server).

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method comprising:
performing an authentication and authorization procedure for trusted wireless local area network access to evolved packet core, involving a third generation partnership project authentication authorization accounting server, a trusted wireless local area network access network, and a third generation partnership project authentication authorization and accounting proxy,
wherein
the third generation partnership project authentication authorization accounting server is configured to
receive an indication indicating whether international equipment identity checking is required by a visited public land mobile network or by a home public land mobile network, and
based on receiving an indication indicating that international mobile equipment identity checking in the visited public land mobile network is required, send an authentication authorization accounting diameter extensible authentication protocol answer message including a flag indicating that international mobile equipment identity checking by an equipment identity register in the visited public land mobile network is requested,
the trusted wireless local area network access network is configured to
based on receiving the authentication authorization accounting diameter extensible authentication protocol answer message including the flag indicating that international mobile equipment identity checking by the equipment identity register in the visited public land mobile network is requested, send an authentication authorization accounting diameter extensible authentication protocol request message including the flag indicating that international mobile equipment identity checking by the equipment identity register in the visited public land mobile network is requested, and
the third generation partnership project authentication authorization and accounting proxy is configured to
based on receiving the authentication authorization accounting diameter extensible authentication protocol request message including the flag indicating that international mobile equipment identity checking by the equipment identity register in the visited public land mobile network is requested, request the equipment identity register in the visited public land mobile network to check an international mobile equipment identity and forward an international mobile equipment identity check result towards the third generation partnership project authentication authorization accounting server,
wherein the international mobile equipment identity check result is associated with an action to be taken based on the international mobile equipment identity check, the action including one of a stop action, a continue action, or a continue only for an emergency session action.

2. The method of claim 1,
wherein the flag is set within a diameter-extensible authentication protocol-request (DER)-flags attribute value pair.

3. The method of claim 2,
wherein the flag is set to a value of the DER-flags attribute value pair to indicate whether international mobile equipment identity checking by the equipment identity register in the visited public land mobile network is requested.

4. The method of claim 3,
wherein the value of the attribute value pair is 1 to indicate that international mobile equipment identity checking by the equipment identity register in the visited public land mobile network is requested.

5. The method of claim 1,
wherein the international mobile equipment identity check result indicates a user equipment associated with the international mobile equipment identity is classified as one of white-listed, grey-listed, or black-listed.

6. The method of claim 5,
wherein the action is one of the stop action or the continue only for the emergency session action, based on the international mobile equipment identity check result indicating the user equipment associated with the international mobile equipment identity is classified as one of grey-listed or black-listed.

7. A third generation partnership project authentication authorization accounting server, comprising:
at least one processor;
at least one memory including computer-executable program code;
the at least memory and the computer-executable program code configured to, with the at least one processor, cause the third generation partnership project authentication authorization accounting server at least to:
perform an authentication and authorization procedure for trusted wireless local area network access to evolved packet core, involving the third generation partnership project authentication authorization accounting server, a trusted wireless local area network access network, and a third generation partnership project authentication authorization and accounting proxy,
receive an indication indicating whether international equipment identity checking is required by a visited public land mobile network or by a home public land mobile network, and
based on receiving an indication indicating that international mobile equipment identity checking in the visited public land mobile network is required, send, towards the trusted wireless local area network access network, an authentication authorization accounting diameter extensible authentication protocol answer message including a flag indicating that international mobile equipment identity checking by an equipment identity register in the visited public land mobile network is requested, wherein,
based on receiving, from the trusted wireless local area network access network, an authentication authorization accounting diameter extensible authentication protocol request message including the flag indicating that international mobile equipment identity checking by the equipment identity register in the visited public land mobile network is requested, the third generation partnership project authentication authorization and accounting proxy is to request the equipment identity register in the visited public land mobile network to check an international mobile equipment identity and forward an international mobile equipment identity check result towards the third generation partnership project authentication authorization accounting server, the international mobile equipment identity check result is associated with an action to be taken based on the international mobile equipment identity check, the action including one of a stop action, a continue action, or a continue only for an emergency session action.

8. The third generation partnership project authentication authorization accounting server of claim 7,
wherein the flag is set within a diameter-extensible authentication protocol-request (DER)-flags attribute value pair.

9. The third generation partnership project authentication authorization accounting server of claim 8,
wherein the flag is set to a value of the DER-flags attribute value pair to indicate whether international mobile equipment identity checking by the equipment identity register in the visited public land mobile network is requested.

10. The third generation partnership project authentication authorization accounting server of claim 9,
wherein the value of the attribute value pair is 1 to indicate that international mobile equipment identity checking by the equipment identity register in the visited public land mobile network is requested.

11. The third generation partnership project authentication authorization accounting server of claim 7,
wherein the international mobile equipment identity check result indicates a user equipment associated with the international mobile equipment identity is classified as one of white-listed, grey-listed, or black-listed.

12. The third generation partnership project authentication authorization accounting server of claim 11,
wherein the action is one of the stop action or the continue only for the emergency session action, based on the international mobile equipment identity check result indicating the user equipment associated with the international mobile equipment identity is classified as one of grey-listed or black-listed.

13. The third generation partnership project authentication authorization accounting server of claim 11,
wherein the action is the continue action, based on the international mobile equipment identity check result indicating the user equipment associated with the international mobile equipment identity is classified as white-listed.

14. A method performed by a third generation partnership project authentication authorization accounting server, the method comprising:

performing an authentication and authorization procedure for trusted wireless local area network access to evolved packet core, involving the third generation partnership project authentication authorization accounting server, a trusted wireless local area network access network, and a third generation partnership project authentication authorization and accounting proxy, receiving an indication indicating whether international equipment identity checking is required by a visited public land mobile network or by a home public land mobile network, and based on receiving an indication indicating that international mobile equipment identity checking in the visited public land mobile network is required, sending, towards the trusted wireless local area network access network, an authentication authorization accounting diameter extensible authentication protocol answer message including a flag indicating that international mobile equipment identity checking by an equipment identity register in the visited public land mobile network is requested, wherein,
based on receiving, from the trusted wireless local area network access network, an authentication authorization accounting diameter extensible authentication protocol request message including the flag indicating that international mobile equipment identity checking by the equipment identity register in the visited public land mobile network is requested, the third generation partnership project authentication authorization and accounting proxy is to request the equipment identity register in the visited public land mobile network to check an international mobile equipment identity and forward an international mobile equipment identity check result towards the third generation partnership project authentication authorization accounting server, the international mobile equipment identity check result is associated with an action to be taken based on the international mobile equipment identity check, the action including one of a stop action, a continue action, or a continue only for an emergency session action.

15. The method of claim 14,
wherein the flag is set within a diameter-extensible authentication protocol-request (DER)-flags attribute value pair.

16. The method of claim 15,
wherein the flag is set to a value of the DER-flags attribute value pair to indicate whether international mobile equipment identity checking by the equipment identity register in the visited public land mobile network is requested.

17. The method of claim 16,
wherein the value of the attribute value pair is 1 to indicate that international mobile equipment identity checking by the equipment identity register in the visited public land mobile network is requested.

18. The method of claim 14,
wherein the international mobile equipment identity check result indicates a user equipment associated with the international mobile equipment identity is classified as one of white-listed, grey-listed, or black-listed.

19. The method of claim 18,
wherein the action is one of the stop action or the continue only for the emergency session action, based on the international mobile equipment identity check result indicating the user equipment associated with the international mobile equipment identity is classified as one of grey-listed or black-listed.

20. The method of claim 18, wherein the action is the continue action, based on the international mobile equipment identity check result indicating the user equipment associated with the international mobile equipment identity is classified as white-listed.

* * * * *